US012032742B2

(12) United States Patent
Van Wyk et al.

(10) Patent No.: US 12,032,742 B2
(45) Date of Patent: Jul. 9, 2024

(54) HAPTIC BUTTON WITH SHAPE MEMORY ALLOY (SMA)

(71) Applicant: CAMBRIDGE MECHATRONICS LIMITED, Cambridge (GB)

(72) Inventors: Peter Van Wyk, Cambridge (GB); Andreas Flouris, Cambridge (GB); Joshua Carr, Cambridge (GB); Marc-Sebastian Scholz, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 465 days.

(21) Appl. No.: 17/290,378

(22) PCT Filed: Nov. 4, 2019

(86) PCT No.: PCT/EP2019/080141
§ 371 (c)(1),
(2) Date: Apr. 30, 2021

(87) PCT Pub. No.: WO2020/089490
PCT Pub. Date: May 7, 2020

(65) Prior Publication Data
US 2021/0405754 A1 Dec. 30, 2021

(30) Foreign Application Priority Data
Nov. 2, 2018 (GB) ...................... 1817980

(51) Int. Cl.
*G06F 3/01* (2006.01)
*H01H 3/12* (2006.01)
(Continued)

(52) U.S. Cl.
CPC ............... *G06F 3/016* (2013.01); *H01H 3/12* (2013.01); *H01H 2003/008* (2013.01);
(Continued)

(58) Field of Classification Search
None
See application file for complete search history.

(56) References Cited

U.S. PATENT DOCUMENTS

| 2003/0076298 A1 | 4/2003 | Rosenberg |
| 2005/0098413 A1* | 5/2005 | Uehira ............... H01H 61/0107 200/5 R |

(Continued)

FOREIGN PATENT DOCUMENTS

| CH | 677 987 | 7/1991 |
| CN | 106484095 A | 3/2017 |

(Continued)

OTHER PUBLICATIONS

GB Search Report dated Apr. 11, 2019 of GB Application 1817980.4.

(Continued)

*Primary Examiner* — Felix O Figueroa
(74) *Attorney, Agent, or Firm* — Haley Guiliano LLP

(57) ABSTRACT

Embodiments herein provide haptic button assemblies with a shape memory alloy actuator (SMA) in which the haptic button has a low profile while still providing a satisfying tactile response or sensation to a user. Advantageously, the haptic button assemblies may have a profile that, for example, enables the assembly to be incorporated into the free space along an edge of a portable computing device. The haptic assemblies may for example, be arranged to move the button perpendicularly with respect to the edge of the device.

19 Claims, 12 Drawing Sheets

(51) Int. Cl.
*H01H 13/85* (2006.01)
*H01H 3/00* (2006.01)

(52) U.S. Cl.
CPC ... *H01H 2215/05* (2013.01); *H01H 2221/064* (2013.01); *H01H 2223/002* (2013.01)

(56) References Cited

U.S. PATENT DOCUMENTS

| | | | |
|---|---|---|---|
| 2009/0128376 A1* | 5/2009 | Caine | G06F 3/0219 341/34 |
| 2009/0250267 A1 | 10/2009 | Heubel et al. | |
| 2017/0284379 A1 | 10/2017 | Krumpelman | |
| 2017/0364158 A1 | 12/2017 | Wen et al. | |
| 2018/0364805 A1 | 12/2018 | El-Ouardi et al. | |
| 2019/0121438 A1 | 4/2019 | Khoshkava | |

FOREIGN PATENT DOCUMENTS

| | | |
|---|---|---|
| CN | 107526435 A | 12/2017 |
| CN | 108475106 A | 8/2018 |
| GB | 2 551 657 | 12/2017 |
| GB | 201813135 | 9/2018 |
| GB | 2571384 A | 8/2019 |
| KR | 1020090128163 | 12/2009 |
| KR | 1020120075003 | 7/2012 |
| WO | WO 2017208003 | 12/2017 |
| WO | WO 2018046937 | 3/2018 |

OTHER PUBLICATIONS

International Search Report and Written Opinion of PCT/EP2019/080141 dated Mar. 1, 2020.
British Examination Report, dated Apr. 28, 2022, issued in British Pat. App. No. 2107791.2 (4 pages).

* cited by examiner

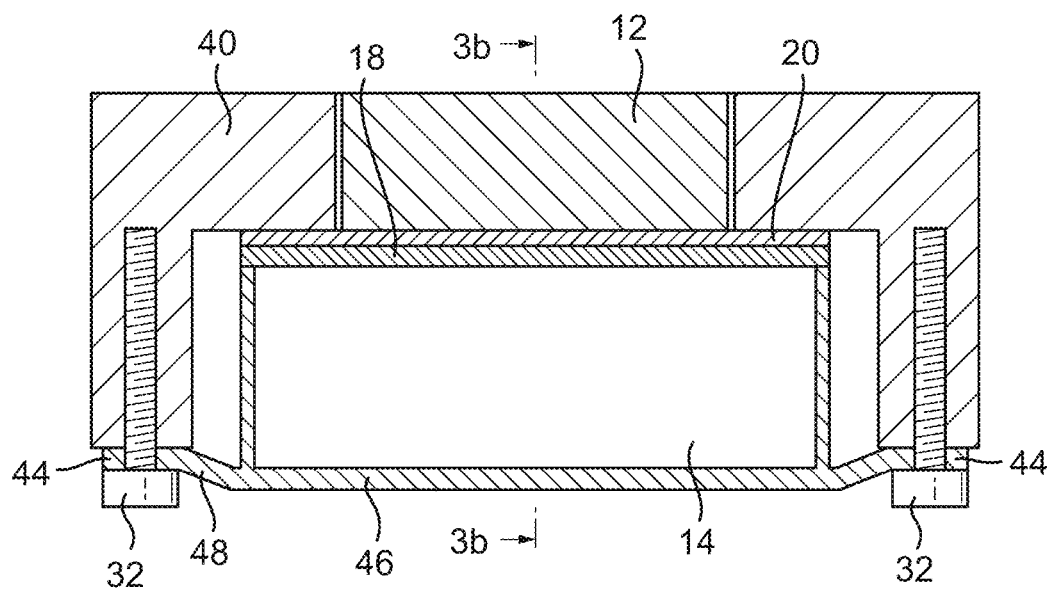
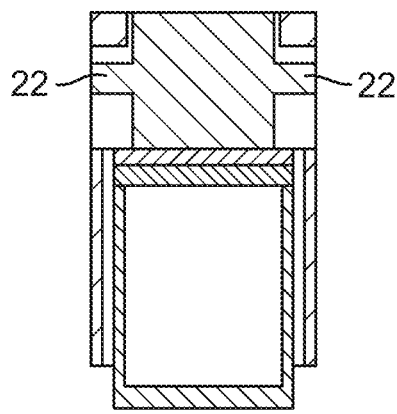 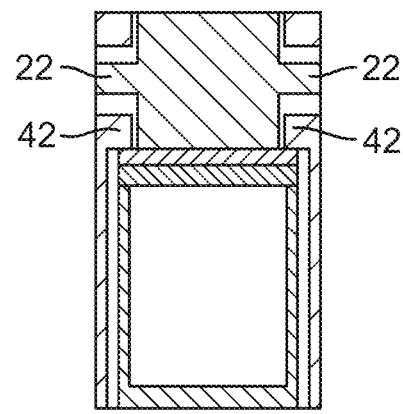

HAPTIC BUTTON WITH SHAPE MEMORY ALLOY (SMA)

CROSS-REFERENCE TO RELATED APPLICATIONS

This application is a national stage application under 35 U.S.C. § 371 of International Application PCT/EP2019/080141, filed Nov. 4, 2019, which claims priority of GB Patent Application 1817980.4, filed Nov. 2, 2018. The disclosure of which are hereby incorporated by reference herein in their entireties.

The present techniques generally relate to apparatus for providing haptic feedback in electrical and electronic products, and for methods of manufacturing the apparatus.

Consumer electronics devices, such as laptops and smartphones, may employ different types of controls to give users of the devices some feedback indicating that they have successfully pressed a button on the device. This is generally known as haptic feedback, and haptic buttons or controls on a device may provide a tactile sensation to the user to confirm that they have successfully pressed the button/control/switch. A haptic button may be provided as a module or assembly for incorporation within an electronic device by a device manufacturer. However, space within mobile and portable consumer electronic devices is typically at a premium. Haptic buttons may be located along or near edges of a smartphone or a portable computing device, for example, so that the display screen may be maximised. The ever-decreasing thickness of portable computing devices, and the increasing display screen size, means that there is relatively little free space within a smartphone for haptic buttons. It is therefore, advantageous to produce a haptic button having a low profile, e.g. having a low/small height such that the button is able to be incorporated into the free space along an edge of a portable computing device. Such low profile haptic buttons are relatively difficult to incorporate in devices.

The present applicant has identified the need for an improved haptic button assembly for electronic devices.

According to a first aspect of the present techniques, there is provided an SMA actuator module for a button of an electronic device, the actuator module comprising: a housing; an actuator housed within the housing; and at least one resilient element configured to bring the actuator module into contact (directly or indirectly) with the button and/or the electronic device when the actuator module is mounted within the electronic device; wherein the at least one resilient element is configured to deform, thereby transferring force to the electronic device, in response to a force applied to the button that exceeds a predetermined maximum force.

The force applied to the button preferably corresponds to a force in a direction normal to an outer surface of the button.

The maximum force is generally less than a maximum force that can be applied to the actuator module without damage. The maximum force may be, for example, greater than 3 newtons, greater than 5 newtons, greater than 10 newtons, greater than 15 newtons or greater than 20 newtons.

Preferably, the at least one resilient element does not deform in response to forces applied to the button below the predetermined maximum force.

The at least one resilient element is preferably preloaded with a preload force corresponding to the maximum force.

According to a second aspect of the present techniques, there is provided a haptic button assembly comprising a button and the actuator module described above, wherein when a user presses the button, the actuator assembly is activated to provide haptic feedback to the user.

According to a third aspect of the present techniques, there is provided an electronic device comprising a casing and the haptic button assembly mounted within the casing.

According to another aspect of the present techniques, there is provided a method of manufacturing an electronic device with a haptic button assembly, the method comprising: providing an actuator module comprising an actuator housed within a housing and at least one resilient element, wherein, in use, the actuator when activated provides haptic feedback to a user pressing on a button of the haptic button assembly; mounting the actuator module within a cavity in the electronic device so that the at least one resilient element brings the actuator module into contact with the button and/or the electronic device, wherein the at least one resilient element is configured to deform, thereby transferring force to the electronic device, in response to a force applied to the button that exceeds a predetermined maximum force. The method may comprise attaching a button after mounting the actuator module.

According to another aspect of the present techniques, there is provided an actuator module for a button of an electronic device, the actuator module comprising: a housing and an actuator housed within the housing, wherein the actuator when activated provides haptic feedback to a user pressing on the button, wherein the housing is configured to bring the actuator module into contact with the button and/or the electronic device when the actuator module is mounted within the electronic device.

Further preferred features are set out in the appended dependent claims.

Implementations of the present techniques will now be described, by way of example only, with reference to the accompanying drawings, in which:

FIG. 1b is a cross-sectional view along line AA of FIG. 1a;

FIG. 2b is a cross-sectional view along line AA of FIG. 2a;

FIG. 3a is a schematic cross-sectional view of a third actuator mounted within a casing;

FIG. 3b is a cross-sectional view along line AA of FIG. 3a;

FIG. 3c is a cross-sectional view along line AA of a variant of FIG. 3a;

FIG. 4b is a cross-sectional view along line AA of FIG. 4a;

FIG. 4c is a cross-sectional view along line AA of a variant of FIG. 4a;

FIG. 5b is a cross-sectional view along line AA of FIG. 5a;

FIG. 5c is a cross-sectional view along line AA of a variant of FIG. 5a;

FIG. 6b is a cross-sectional view along line AA of FIG. 6a;

FIG. 6c is a cross-sectional view along line AA of a variant of FIG. 6a;

FIG. 7b is a cross-sectional view along line AA of FIG. 7a;

FIG. 7c is a cross-sectional view along line AA of a variant of FIG. 7a;

FIG. 8b is a cross-sectional view along line AA of FIG. 8a;

FIG. 8c is a cross-sectional view along line AA of a variant of FIG. 8a;

FIG. 9a is a schematic cross-sectional view of a variant of the first actuator shown in FIG. 1a;

FIG. 9b is a cross-sectional view along line AA of FIG. 9a;

FIG. 10a is a schematic cross-sectional view of a variant of the actuator shown in FIG. 4a;

FIG. 10b is a cross-sectional view along line AA of FIG. 10a;

FIGS. 12a and 12b show a variant of the arrangement shown in FIG. 3a; and

FIGS. 13a and 13b show a variant of the arrangement shown in FIG. 12a.

Figure 1A:
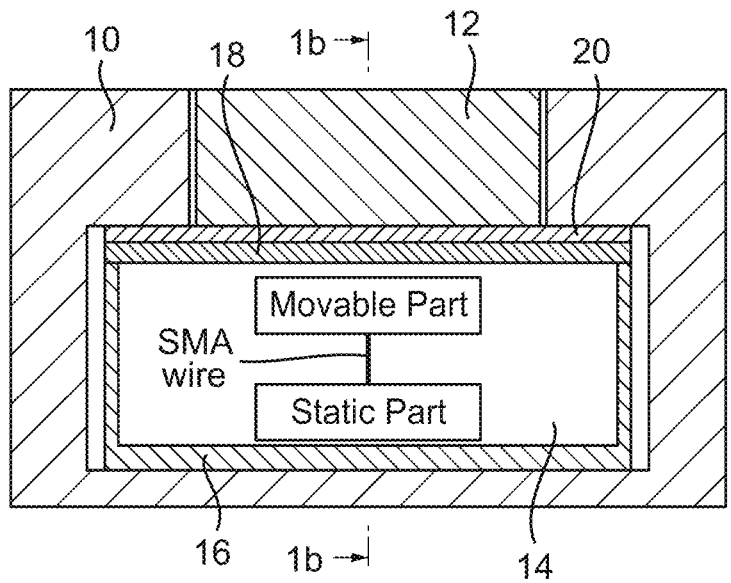
FIG. 1a is a schematic cross-sectional view of a first actuator mounted within a casing.

Broadly speaking, embodiments of the present techniques provide haptic button assemblies in which the haptic button has a low profile while still providing a satisfying tactile response or sensation to a user. Advantageously, the haptic button assemblies may have a profile that, for example, enables the assembly to be incorporated into the free space along an edge of a portable computing device. The haptic assemblies may, for example, be arranged to move the button perpendicularly with respect to the edge of the device. Alternatively, the button may be moved laterally along the edge of the device, or helically around an axis perpendicular to the edge of the device or in any other suitable direction, e.g. in plane rotations parallel to the edge of the device or perpendicular to the device.

It is possible to generate a haptic sensation from a button or movable portion by moving the button in a lateral direction with respect to the contact by the user—see, for example, WO2018/046937 and GB2551657. A disadvantage of a haptic button that moves laterally is that it may require a large gap between the moving button and the edges of the housing which houses the button to allow lateral motion of the button, but the large gap means it is more difficult to make the haptic button water proof and dust proof in an energy efficient manner. It is also desirable to provide a haptic button which does not have a large visible gap (e.g. of the order of 250 μm for a laterally moving button) between the button and the housing, as a smaller gap (e.g. of the order of 50 μm or less) is more aesthetically pleasing.

Using a haptic button that moves in a direction that is normal to the surface of the button and the surface of a device in which the button is incorporated may mean that the gap size may be reduced. Examples of SMA actuators which generate vertical movement are described in WO2019/162708 and GB2571384 to the present applicant. As will be appreciated, the techniques described herein also apply to other types of SMA actuators that also generate vertical movement.

Furthermore, due to the pressures on size and layout associated with many consumer electronics devices such as wearables, watches and mobile phones, it is also desirable that the haptic button assembly has a low profile.

The present techniques provide haptic button assemblies which have both a low profile (such that they may be more readily incorporated into consumer electronics devices such as smartphones), and may be water and dust proof. As described in more detail, some of the arrangements comprise a sealing layer to form a water and/or dust proof seal. The sealing layer may be formed from any suitable material, e.g. an impermeable material which is impermeable to water and/or dust, a thin film polymer, a thin silicone film, nitrile rubber, a rubber-like material, a digital material such as FLX 9040 described on https://www.prototypeprojects.com/wp-content/uploads/2018/04/2018-04-PP-Core-Materials-approved pdf, Viton, neoprene, ethylene propylene rubber (EPR), PTFE and polyurethane. A loading force on the sealing layer may be required to compress the material of the sealing layer sufficiently (e.g. by between 10-30%) to create the water and/or dust proof seal.

The present techniques may provide a local haptic sensation caused by a direct impulse, rather than through inertial effects. For example, smartphones comprise inertial haptic actuators—a significant mass is moved when a haptic effect is required. Movement of the mass causes the whole smartphone to shake or vibrate. Thus, the haptic effect is general and is not localised. The present techniques provide a localised haptic feedback. Further still, the haptic feedback provided by the present techniques may be customisable by a user by modifying software parameters. This allows different types of haptic feedback to be provided for different purposes or to suit different users.

The haptic button assemblies described below may incorporate a shape memory alloy (SMA) actuator. Such an SMA actuator may be any type of device that comprises a static part and a moveable part which is moveable with respect to the static part. The moveable part is moved by at least one SMA wire which is activated when a user pushes on the button. Activation of the SMA wire causes it to contract which moves the moveable part. The moveable part may be restored to its original position by a restoring element which provides a restoring force. The restoring element may be a resilient element, e.g. a spring, or another SMA wire(s).

Each of the haptic button assemblies described herein may be incorporated into any device in which it may be useful to provide a user of the device with haptic feedback. For example, the haptic button assemblies may be incorporated into an electronic device or a consumer electronics device, such as a computer, laptop, portable computing device, smartphone, computer keyboard, gaming system, portable gaming device, gaming equipment/accessory (e.g. controllers, wearable controllers, etc.), medical device, user input device, etc. It will be understood that this is a non-limiting, non-exhaustive list of possible devices, which may incorporate any of the haptic button assemblies described herein. The haptic button assemblies described herein may be, for example, incorporated into or otherwise provided along an edge of a smartphone or on a surface of a smartphone.

The haptic button assemblies, or at least parts of the haptic button assemblies described herein, may be provided as standalone modules that may be incorporated into an electronic device during manufacture, and may be adapted to suit the device specifications such that it fits into a casing or external surface of the electronic device. The term casing is used to cover any part of the frame or structure of the electronic device to which the haptic button assembly may be attached within the electronic device. Accordingly, the terms casing, frame or structure may be used interchangeably. In alternative embodiments, some or all of the components of the haptic button assemblies described herein may be integrally formed in an electronic device. For example, the button of each haptic button assembly may be part of the electronic device itself. Each haptic button assembly may comprise electrical connections, which may couple the assembly to the device's processor(s), chip(s), motherboard, etc., such that the action of the button of the assembly being pressed may be processed by the device and so that the haptic feedback can be provided.

Various haptic button assemblies are now described with respect to the Figures. It will be understood that elements or features described with respect to one particular Figure or haptic button assembly may equally apply to any of the Figures or haptic button assemblies described herein. For example, the techniques for attaching the actuator module to the casing, the components of the actuator or the sealing layer described with respect to particular Figures, may apply equally to any or all of the haptic button assemblies described herein.

FIG. 1a shows a haptic button assembly mounted within a cavity within a casing 10, e.g. the casing of a phone or other electronic device. The haptic button assembly comprises a button 12 which is activated by an actuator 14. The actuator 14 may be an SMA actuator that comprises a static part, a moveable part which is moveable relative to the static part and at least one SMA wire which contracts to move the moveable part. Movement of the moveable part may cause the button 12 to move to generate haptic feedback to a user. The button 12 may thus be moveable between a first resting position and a second activated position. The button may protrude from the casing, may be substantially flush with the casing, or may be part of the casing itself (as shown for example in FIG. 11d).

The actuator 14 is housed within a housing 16 which typically surrounds the base and sides of the actuator 14. The housing 16 may also partially cover the top of the actuator 14. The housing 16 has an opening between the button 12 and the actuator 14.

In this arrangement, a restoring element 18, e.g. a resilient element such as spring, is schematically shown as positioned adjacent the actuator 14 in the opening of the housing 16. The restoring element 18 may provide a restoring force to return the button 12 to its resting position after activation by the actuator 14. The restoring element 18 may thus be considered to be part of the actuator 14 and the separation of the components in this and other Figures schematically aids an understanding of the construction of this particular arrangement. As shown, the edges of the restoring element 18 overlap the edges of the sides of the housing 16 so that the restoring element 18 can be fixed to the housing. The fixing may be using any suitable method, e.g. when both the housing and restoring element are made from metal, e.g. steel or stainless steel, they may be fixed by welding. Alternatively, if the restoring element is made from another material such as a polymer or aluminium which cannot be fixed by welding, another suitable technique may be used.

The arrangement shown in FIG. 1a shows an actuator which when activated provides vertical movement of the button 12. Accordingly, the restoring element 18 is arranged between the actuator 14 and the housing 16. However, it will be appreciated that this is just one arrangement, and if an alternative actuator, e.g. an actuator which provides horizontal movement of the button 12, is used the restoring element 18 may be in a different location. Accordingly, the use of the restoring element 18 to couple to the housing is optional and depends on the arrangement of the actuator.

In this arrangement, there are small gaps either side of the button 12 between the button and the casing. It will be appreciated that this is merely illustrative and there may be no gaps between the button and the casing, e.g. a gapless button design as shown in FIG. 11d. When there are gaps, as shown an optional sealing layer 20 may be used. The sealing layer 20 provides a water proof and dust proof seal to prevent damage to the components of the actuator and/or device. When the restoring layer 18 is attached to the housing as shown, the sealing layer 20 may be fixed to the restoring element using any known technique, e.g. using adhesive. Alternatively, when there is no restoring element, the sealing layer 20 may be directly fixed to the housing to seal the actuator. As arranged, the restoring element provides a load path from the actuator to the sealing layer and from the sealing layer to the casing to provide the seal.

For optimal sealing, the sealing layer 20 needs to be compressed and thus needs to be subject to a loading force. This is achieved in this arrangement by shaping the cavity within which the haptic button assembly is mounted to fit the haptic button assembly. The haptic button assembly may be press fit into the cavity. The press-fit is sufficient to compress the sealing layer 20 to provide the necessary loading force to create a seal which may be water and/or dust proof. The seal prevents water and/or dust entering the actuator housing and/or the electronic device.

Figure 1B:
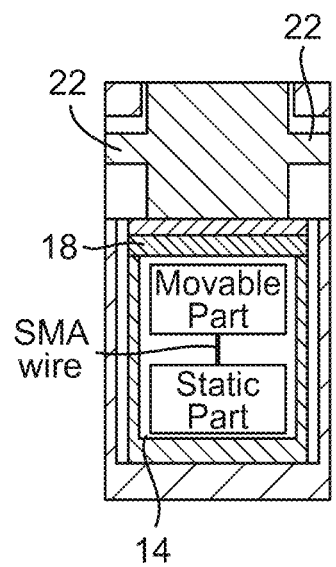

As shown in FIG. 1b, the button 12 comprises flanges 22. The size of the flanges 22 has been exaggerated on the drawings to highlight these features. There may be one or more pairs of flanges 22, with each pair having a flange on either side of the button 12. The flanges 22 are resilient to allow the button assembly to be press-fit into the cavity. Once the button assembly is in place, these flanges 22 engage a surface of the casing 10 to prevent the button assembly from falling out of the casing.

The button assembly of FIGS. 1a and 1b may be assembled by mounting the actuator in the housing to form an actuator module, securing the restoring element to the housing (e.g. by welding) and mounting the sealing layer to the restoring element (e.g. by adhesive) to seal the actuator module. As explained above, the restoring element may be in a different location, e.g. within the housing for the actuator. The actuator module may then be inserted into the cavity through an aperture which was pre-formed on the casing. A temporary lubricant, e.g. alcohol, may be used to facilitate insertion of the actuator module into the casing. The direction of insertion of the actuator assembly into the cavity is along an axis which is perpendicular to the plane of FIG. 1a as shown in FIG. 11c. Once the actuator module is in place, there is a loading force on the sealing layer. The actuator module may be considered to be configured to provide the loading force by the shaping and sizing of the housing to closely fit the cavity. Thereafter, the button may be fixed to the sealing layer, e.g. by the use of clips or adhesive, to form the complete haptic button assembly. In some arrangements, there may be an aperture in the sealing layer to accommodate fixing direct to the actuator.

Figure 1C:
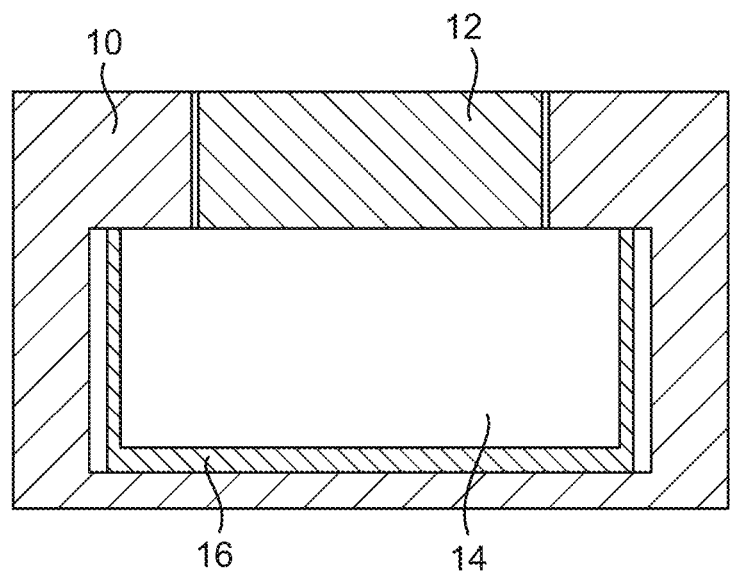
FIG. 1c is a schematic cross-sectional view of an alternative arrangement of the first actuator in which the optional sealing layer is omitted and the restoring element is incorporated in the actuator.

FIG. 1c shows an alternative arrangement in which the optional sealing layer is omitted and the restoring element is incorporated in the actuator 14. In this arrangement, the actuator module comprises the actuator 14 within the housing 16. The actuator module is fitted into a cavity in the casing 10. The button 12 is attached direct to the actuator itself. The actuator module is configured to be a press fit in the cavity to ensure a good contact between the actuator and the button.

Figure 2A:
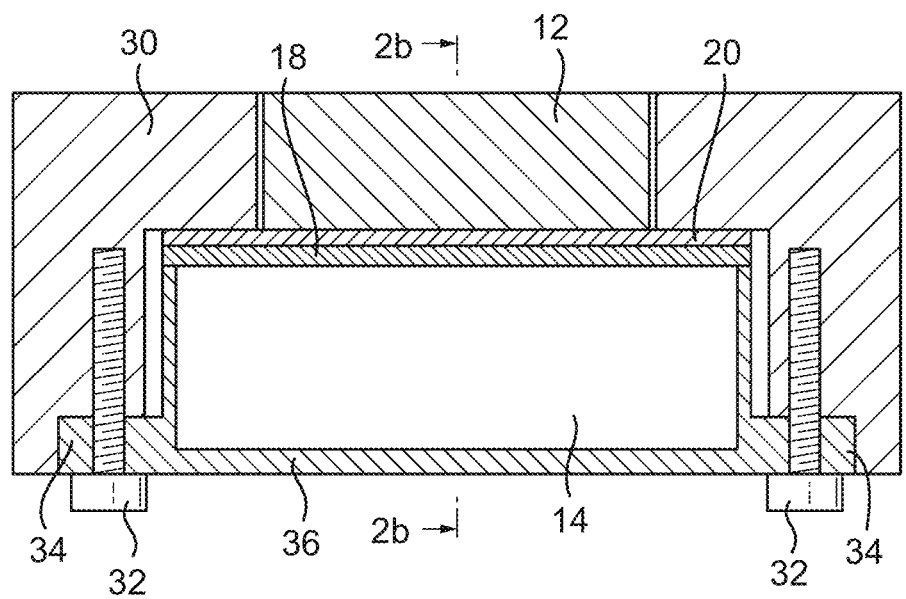
FIG. 2a is a schematic cross-sectional view of a second actuator mounted within a casing.
Figure 2B:
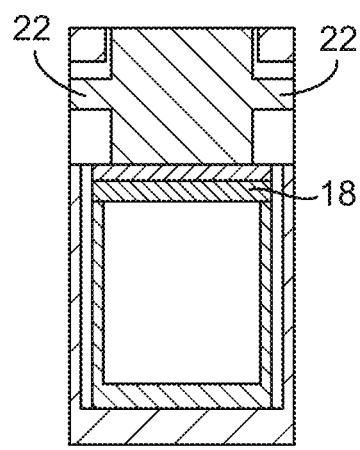

It will be appreciated that although the arrangement of FIG. 1a has a relatively small number of components and has a low profile, the manufacturing tolerance between the cavity in the casing and the button assembly needs to be tightly controlled to achieve the desired compressive force on the sealing layer. FIGS. 2a and 2b show a variant of the arrangement shown in FIG. 1a in which the loading force on the sealing layer is achieved in a different way. Components which are the same retain the same reference number.

As in FIG. 1a, FIGS. 2a and 2b show a haptic button assembly mounted within a cavity within a casing 30. The haptic button assembly comprises a button 12 which is activated by an actuator 14 which forms part of an actuator module. The actuator 14 is housed within a housing 36. A restoring element 18 is positioned adjacent the actuator 14 in an opening of the housing 36 but as explained above, the restoring element may be incorporated within the actuator or elsewhere in the assembly. An optional sealing layer 20 is also depicted. The button 12 also comprises flanges 22.

In this arrangement, the casing 30 of the electronic device does not extend under the base of the actuator module and thus the cavity may be considered to be open. This may allow the actuator module to be simply dropped into the cavity. Alternatively, as described above, the actuator module may be pushed in through the side as described above.

The actuator module is secured in place by using a screw fixing arrangement. Where the optional sealing layer is included, the use of screws means that the loading force on the sealing layer may be controlled by appropriate tightening of the screws. Similarly, when there is no optional sealing layer, the contact between the actuator module and the button may be controlled by appropriate tightening of the screws.

The housing 36 comprises a pair of flanges 34 which extend from the sides of the housing 36 towards the base of the housing. The flanges 34 are relatively thick and thus the housing assembly is relatively stiff. In this arrangement, the flanges 34 are received in corresponding recesses of the casing 30. However, it will be appreciated that as shown in the Figures below, the flanges may simply abut against the casing. The recesses may assist in correctly locating the actuator module within the casing to facilitate insertion of the screws and may also reduce the overall profile of the arrangement. When the actuator module is inserted into the cavity, there may initially be a small gap between the flanges 34 and the casing 30. This gap is closed and the actuator module is held in place within the casing 30 by a pair of screws 32 which are engaged in corresponding holes in the flanges 34 of the housing 36 and screw threads in the casing 30. The casing 30 thus needs to be pre-formed with screw threads.

The button assembly of FIGS. 2a and 2b may be assembled in a similar manner to FIGS. 1a and 1b. In other words, the manufacturing method may comprise mounting the actuator in the housing, securing the restoring element to the housing (where the restoring element is located between the housing and the button), and mounting the optional sealing layer to the restoring element (e.g. by adhesive). In this arrangement, the insertion of the actuator module into the cavity can be achieved either through an aperture which was pre-formed on the casing or by dropping the assembly into the open cavity. The actuator module is then held in place by the screws and the loading force on the sealing layer can also be adjusted by tightening the screws. Where there is no sealing layer, the contact between the actuator module and the button and/or casing may be adjusted by tightening the screws. Thus, the housing may be considered to be configured to provide the contact by including the flanges to accommodate the screw mechanism. Thereafter, the button may be fixed to the sealing layer or directly to the button a described above.

FIGS. 3a and 3b show a variant of the arrangement shown in FIG. 2a. Components which are the same retain the same reference number. As in FIG. 2a, FIGS. 3a and 3b show a haptic button assembly mounted within a cavity within a casing 40. The haptic button assembly comprises a button 12 which is activated by an actuator 14 which forms part of an actuator module. The casing 40 is also open over the base of the actuator module. The actuator 14 is housed within a housing 46. A restoring element 18, is positioned adjacent the actuator 14 in an opening of the housing 46 but as explained above, the restoring element may be incorporated within the actuator or elsewhere in the assembly. An optional sealing layer 20 is also depicted.

In this arrangement, the base of the housing 46 is flexible and comprises a pair of flexible flanges 44 which are arranged adjacent the ends of the casing 40. The actuator module is held in place within the casing 40 by a pair of screws 32 which are engaged in corresponding holes in the flanges 44 of the housing 46 and screw threads in the casing 40. As in FIGS. 2a and 2b, where the optional sealing layer is included the loading force on the sealing layer can be adjusted as desired by appropriate tightening of the screws. Similarly, when there is no optional sealing layer, the contact between the actuator module and the button may be controlled by appropriate tightening of the screws. Thus, the housing may be considered to be configured to provide the force/contact by including the flexible base with flanges. The method of manufacture for this arrangement may also be the same as described above for the FIG. 2a variant.

There is a risk that the actuator, e.g. the internal components such as sliders, ball bearing and contact switches, may be damaged by a user pressing too forcefully on the button 12. In this arrangement, when a user presses on the button 12, the force is transferred through the button to the sealing layer 20 to the restoring element 18 into the actuator 14 and then into the base of the housing 46. The force is then passed into the screw mechanism, e.g. the flanges and screws. In other words, the flexible flanges 44 deform and transfer force to the casing 40. Accordingly, by appropriately controlling the preloading force of the flexible flanges 44, a maximum force that can be applied to the actuator can be defined, with greater forces being transferred to the casing 40.

An excessive force by the user may result in a sufficient deformation of the screw mechanism that the sealing layer 20 is no longer compressed against the surface of the casing. Thus, the seal is broken and dust or water may leak into the device. It will be appreciated that the load transfer will be different if the sealing layer is omitted and the restoring element is located in a different location. Nevertheless, a similar problem may occur if a user pressed too hard.

FIG. 3c shows a variation of the arrangement of FIGS. 3a and 3b which is designed to address this problem. As in FIGS. 1b and 2b, the button 12 comprises flanges 22. In this variant, an end stop 42 is formed on the casing adjacent each flange 22. When the button is inserted in the casing, there is a gap between each flange 22 and its corresponding end stop 42. The gap allows for depression of the button by a user to activate the actuator to achieve the haptic effect. However, if the button is forced down too far by the user, the flange 22 abuts the corresponding end stop 42 and further downward movement of the button 12 is prevented. Accordingly, the breaking of the seal between the sealing layer and the casing may be avoided. It will be appreciated that the gap is relatively small, e.g. between 30 to 100 μm. Thus the tolerance on manufacture of the end stop needs to be accurate to allow sufficient movement to achieve the haptic effect but prevent too large a movement which may be damaging.

Figure 4A:
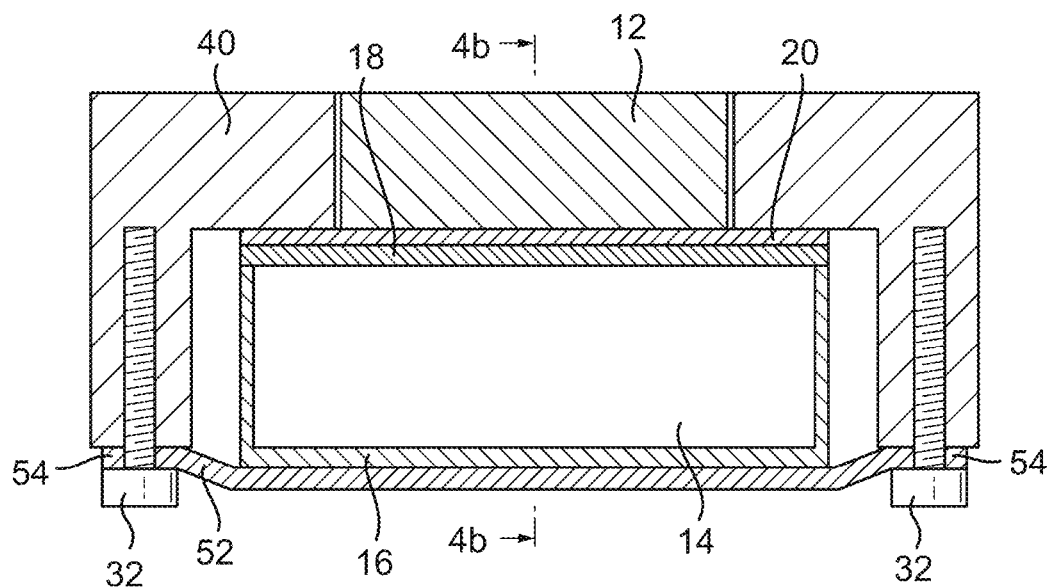
FIG. 4a is a schematic cross-sectional view of another actuator mounted within a casing.
Figure 4B:
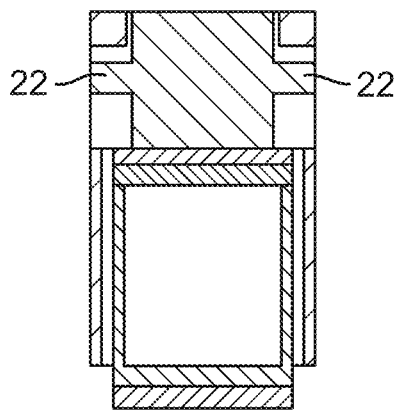

FIGS. 4a and 4b show a variant of the arrangement shown in FIG. 3a. Components which are the same retain the same reference number. As in FIG. 3a, FIGS. 4a and 4b show a haptic button assembly comprising a button 12 and an actuator 14 of an actuator module mounted within a cavity within a casing 40. The actuator 14 is housed within a housing 56. A restoring element 18 and a sealing layer 20 are also depicted.

In this arrangement, the housing 16 has a similar shape to that shown in the arrangement of FIG. 1a and thus does not comprise any flanges. A flexible base layer 52 is mounted to the housing 16 to provide the same flexible and fixing functionality as shown in the previous arrangement. The base layer 52 comprises a pair of flanges 54 which are arranged adjacent the ends of the casing 40. The flanges 54 are more rigid than the parts of the base layer 52 which are adjacent the housing 16. The actuator module is held in place within the casing 40 by a pair of screws 32 which are engaged in corresponding holes in the flanges 54 of the base layer 52 and screw threads in the casing 40. The loading on the optional sealing layer (if used) may be adjusted as described above by use of the screws 32 and/or the contact between the actuator module and the button and/or casing may be similar adjusted. Thus, the housing may be considered to be configured to provide the force/contact by including the base layer with the flanges.

Figure 4C:
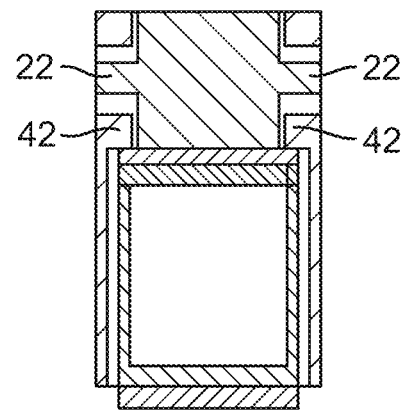

FIG. 4c shows a variation of the arrangement of FIGS. 4a and 4b. As in FIG. 3c, the button 12 comprises flanges 22 which abut a corresponding end stop 42 which is formed on the casing. The end stops 42 thus help to prevent any damage by the user by exerting too great a force on the button 12.

Figure 5A:
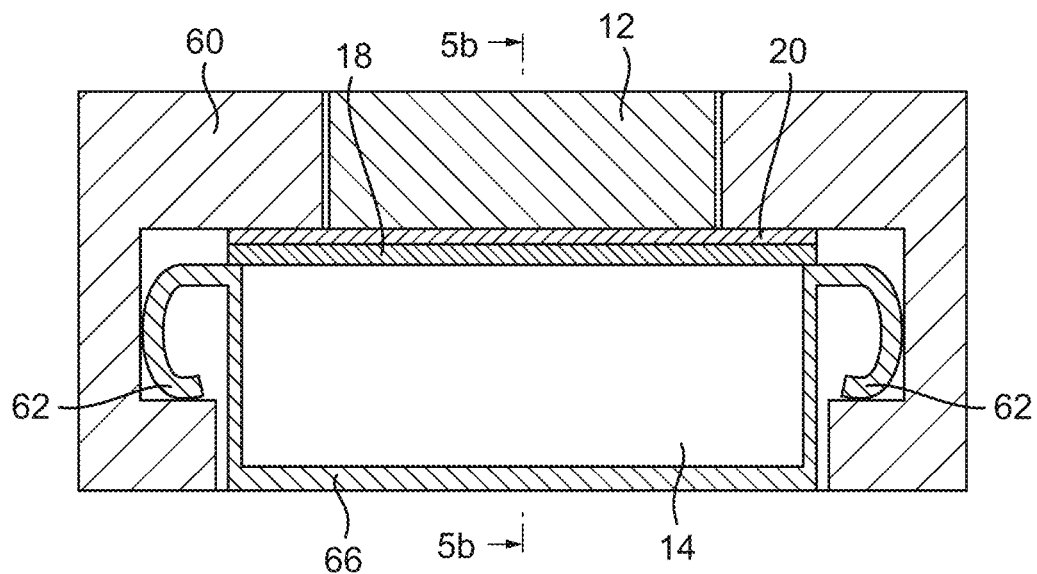
FIG. 5a is a schematic cross-sectional view of another actuator mounted within a casing.
Figure 5B:
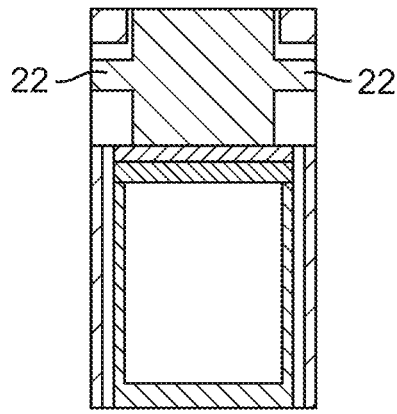

FIGS. 5a and 5b show a variant of the arrangement shown in FIG. 1a. Components which are the same retain the same reference number. As in FIG. 1a, FIGS. 5a and 5b show a haptic button assembly comprising a button 12 and an actuator 14 of an actuator module mounted within a cavity within a casing 60. In this arrangement, the cavity is open over a base of the actuator module. The actuator 14 is housed within a housing 66. A restoring element 18 and a sealing layer 20 are shown adjacent the button 12 but as described above, these may be omitted or incorporated elsewhere.

The housing 66 comprises a pair of resilient members 62 (e.g. springs) which extend from the sides of the housing 66. These resilient members 62 are received in corresponding recesses of the casing 60. The resilient members 62 are curved and are moveable between two positions, a first expanded position and a second compressed position. The resilient member 62 is biased towards the first expanded position. As the actuator assembly is inserted into the casing 60, the resilient members 62 are compressed from the first position to the second position. Once the resilient members 62 are within with the recesses, the resilient members 62 attempt to revert to the first expanded position but are constrained by the recesses. The haptic assembly is thus secured within the cavity in the casing 60 to provide the necessary loading force on the sealing layer (where one is used) or to ensure a good contact between the button and the actuator. Thus, the housing may be considered to be configured to provide the loading force and/or contact by including the resilient elements 62.

Figure 5C:
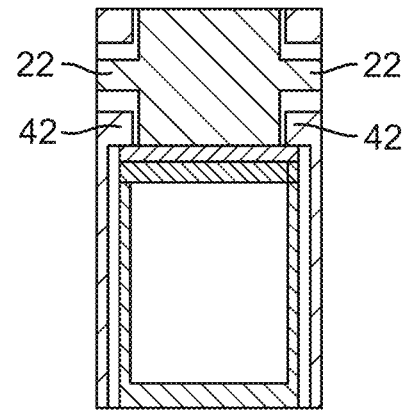

FIG. 5c shows a variation of the arrangement of FIGS. 5a and 5b. As in FIGS. 3c and 4c, the button 12 comprises a pair of flanges 22 which abut a corresponding end stop 42 which is formed on the casing.

Figure 6A:
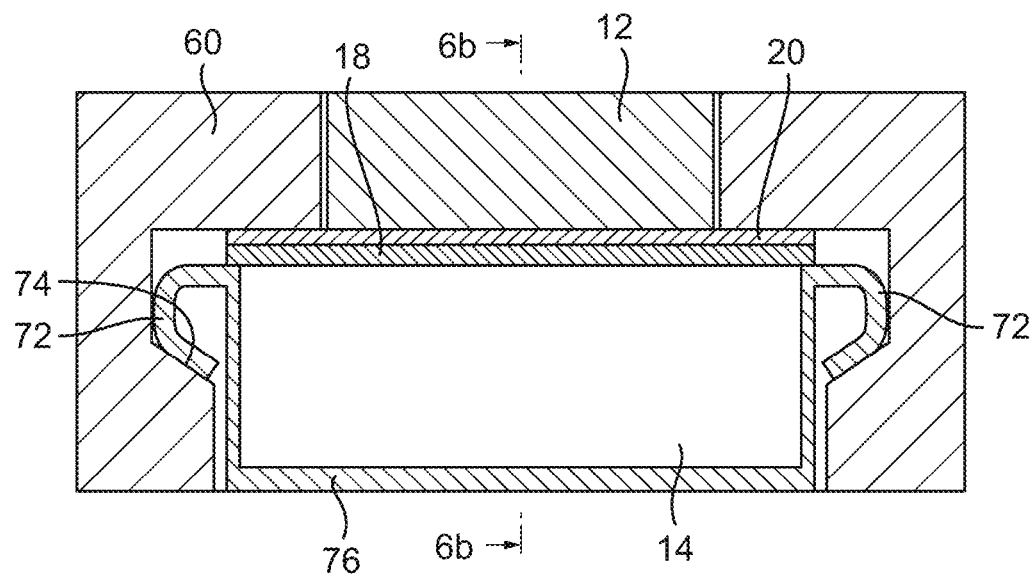
FIG. 6a is a schematic cross-sectional view of another actuator mounted within a casing.
Figure 6B:
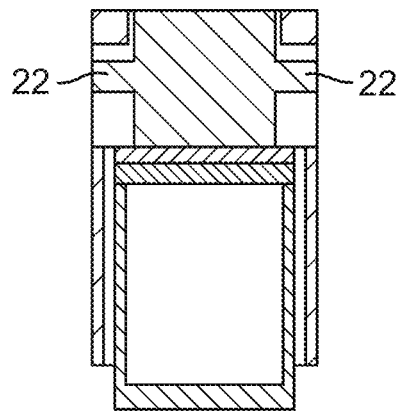

FIGS. 6a and 6b show a variant of the arrangement shown in FIG. 5a. Components which are the same retain the same reference number. As in FIG. 5a, FIGS. 6a and 6b show a haptic button assembly comprising a button 12 and an actuator 14 of an actuator module mounted within a cavity within a casing 70. A restoring element 18 and an optional sealing layer 20 are also depicted.

The housing 76 comprises an integral pair of resilient members 72, e.g. springs formed from suitable materials such as metal, which extend from the sides of the housing 76. These resilient members 72 are received in corresponding recesses of the casing 70. In this arrangement, the resilient members 72 are shaped to match the inner surface of the recess and thus the actuator module may be described as self-aligning because the resilient members align the actuator module centrally within the cavity.

The resilient members 72 are moveable between a first expanded position and a second compressed position. The resilient members 72 are biased towards the first expanded position. As the actuator assembly is inserted into the casing 70, the resilient members 72 are compressed from the first position to the second position shown in FIG. 6a. Once the resilient members 72 are within with the recesses, the resilient members 72 try to revert to the first expanded position but the shape of the recesses maintains the resilient members 72 in the second compression position (or in a similar position). In this second position, an angled part of each resilient member 72 abuts a corresponding angled surface 74 of the recess. The actuator assembly is thus secured within the cavity in the casing 70 to provide the necessary loading force on the sealing layer (where it is used) or provide a good contact between the actuator and the button. Thus, the housing may be considered to be configured to provide the loading force and/or contact by including the resilient elements 72 which are shaped to self-align the actuator module.

Figure 6C:
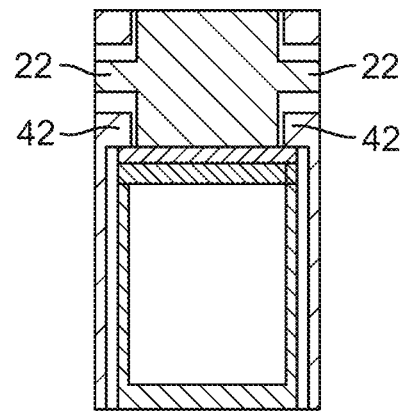

FIG. 6c shows a variation of the arrangement of FIGS. 6a and 6b. As in FIGS. 3c, 4c and 5c, the button 12 comprises a pair of flanges 22 which abut a corresponding end stop 42 which is formed on the casing.

Figure 6D:
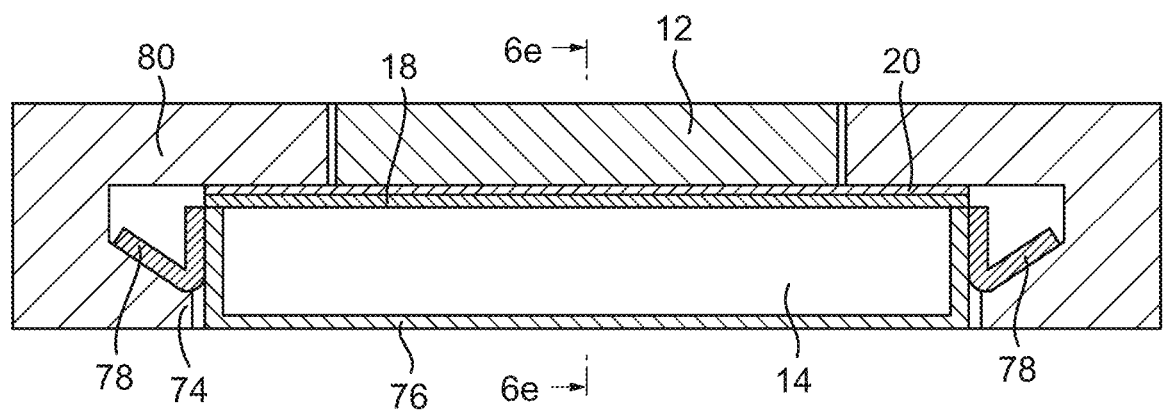
FIG. 6d is a schematic cross-sectional view of another actuator mounted within a casing.
Figure 6E:
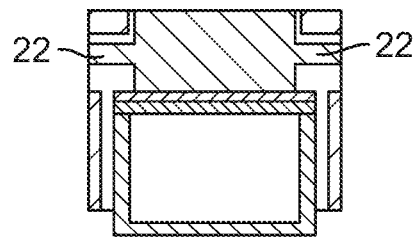
FIG. 6e is a cross-sectional view along line AA of FIG. 6d.

FIGS. 6d and 6e show a variant of the self-aligning arrangement shown in FIG. 6a. Components which are the same retain the same reference number. As in FIG. 6a, FIGS. 6d and 6e show a haptic button assembly comprising a button 12 and an actuator 14 of an actuator module mounted within a cavity within a casing 80. A restoring element 18 and a sealing layer 20 are also depicted.

A pair of resilient members 78 extend from the sides of a housing 76 around the actuator 14. In this arrangement, the resilient members 78 are formed separately from the housing and attached by any suitable attachment mechanism, e.g. welding. However, it will be appreciated that these resilient members 78 could also be integrally formed with the housing 76. As in the previous arrangement, these resilient members 78 are received in corresponding recesses of the casing 70 and are shaped to match the inner surface of the recess. In contrast to the previous arrangement, the resilient members 78 are generally V-shaped and thus have a simpler shape than the previous arrangement but are still moveable between a first expanded position and a second compressed position. The resilient members 78 are biased towards the first expanded position. As the actuator assembly is inserted into the casing 70, the resilient members 78 are compressed from the first position to the second position. Once the resilient members 78 are within with the recesses, the resilient members 78 attempt to revert to the first expanded position with an angled part of each resilient member 78 abutting a corresponding angled surface 74 of the recess. The actuator module is thus secured within the cavity in the casing 80 to provide the necessary loading force on the sealing layer (where used) or provide a good contact between the actuator and the button. Thus, the housing may be considered to be configured to provide the loading force and/or contact by including the resilient elements 78.

Figure 6F:
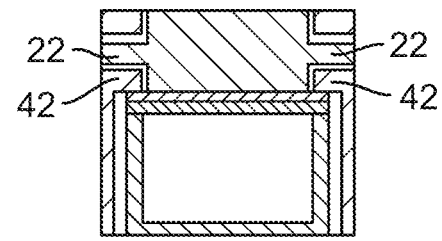
FIG. 6f is a cross-sectional view along line AA of a variant of FIG. 6d.

FIG. 6f shows a variation of the arrangement of FIGS. 6d and 6e. As in FIGS. 3c, 4c, 5c and 6c, the button 12 comprises a pair of flanges 22 which abut a corresponding end stop 42 which is formed on the casing.

Figure 7A:
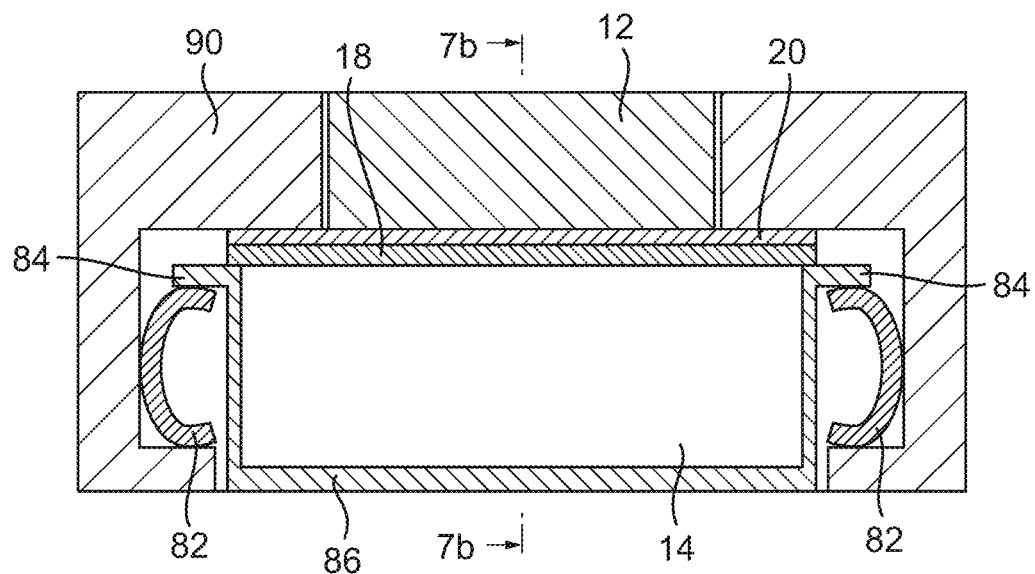
FIG. 7a is a schematic cross-sectional view of another actuator mounted within a casing.
Figure 7B:
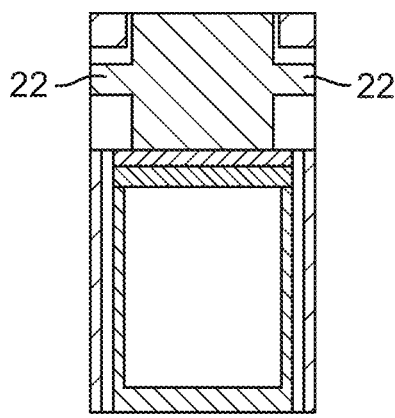

FIGS. 7a and 7b show a variant of the arrangement shown in FIG. 6a. Components which are the same retain the same reference number. As in FIG. 6a, FIGS. 7a and 7b show a haptic button assembly comprising a button 12 and an actuator 14 of an actuator module mounted within a cavity within a casing 80. A restoring element 18 and an (optional) sealing layer 20 are also depicted but could be omitted as described above.

The housing 86 comprises a pair of flanges 84 which extend from the sides of the housing near to the restoring element. The flanges 82 each abut a resilient member 82 which may be a spring, formed from any suitable material such as metal. These resilient members 82 are received in corresponding recesses of the casing 90. The resilient members 82 are moveable between a first expanded position and a second compressed position. The resilient members 82 are biased towards the first expanded position. As the button assembly is inserted into the casing 90, the resilient members 82 are compressed from the first position to the second position. Once the resilient members 82 are within with the recesses, the resilient members 82 attempt to revert to the first expanded position with part of each resilient member 82 abutting both a surface of the recess and the flange 84 on the housing. The actuator module is thus secured within the cavity in the casing 90 to provide the necessary loading force on the sealing layer (where used) or to provide a contact between the actuator and the button. Thus, the housing may be considered to be configured to provide the loading force and/or contact by including the resilient elements 82 and the abutting flanges 84.

Figure 7C:
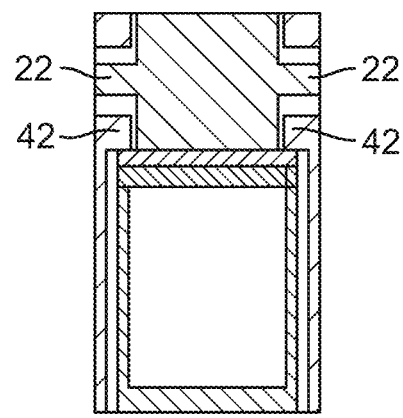

FIG. 7c shows a variation of the arrangement of FIGS. 7a and 7b. As in FIGS. 3c, 4c, 5c and 6c, the button 12 comprises a pair of flanges 22 which abut a corresponding end stop 42 which is formed on the casing.

Figure 8A:
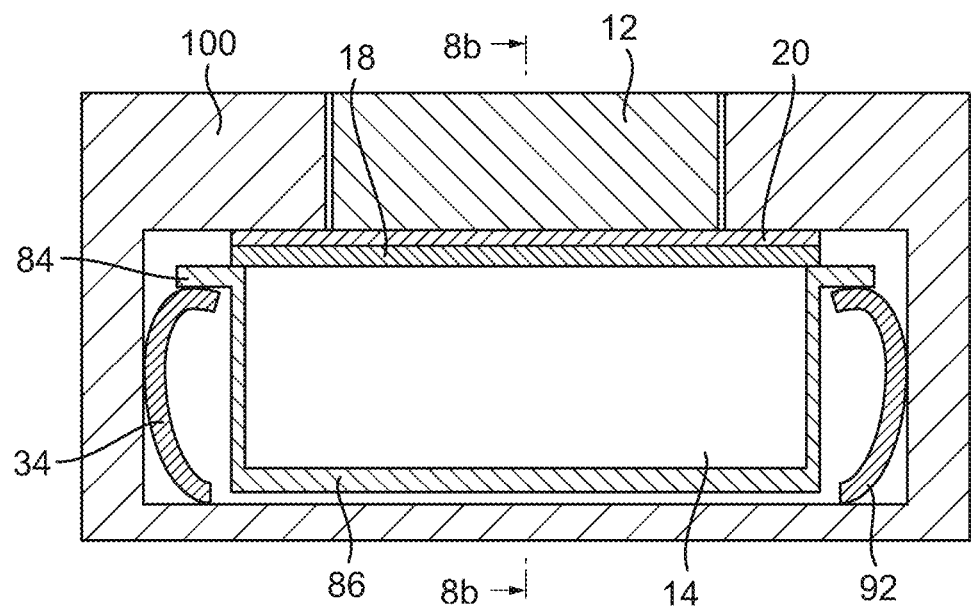
FIG. 8a is a schematic cross-sectional view of another actuator mounted within a casing.
Figure 8B:
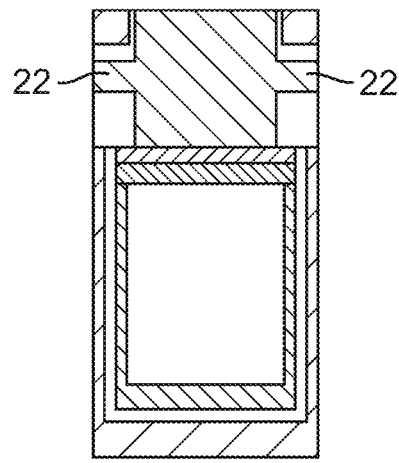

FIGS. 8a and 8b show a variant of the arrangement shown in FIG. 7a. Components which are the same retain the same reference number. As in FIG. 7a, FIGS. 8a and 8b show a haptic button assembly comprising a button 12 and an actuator 14 of an actuator module mounted within a cavity within a casing 100. A restoring element 18 and an optional sealing layer 20 which are also depicted but can be omitted as described above.

As in FIG. 7a, the housing 86 comprises a pair of flanges 84 which each abut a resilient member 92 which may be a metal spring. These resilient members 82 are received in corresponding recesses of the casing 100. In this arrangement, the casing 100 has a base like in FIG. 1a and the resilient members 82 abut the base of the casing. As with FIG. 7a, as the actuator assembly is inserted into the casing 90, the resilient members 92 are compressed from the first position to the second position and once the resilient members 92 are within with the recesses, the resilient members 92 attempt to revert to the first expanded position to abut both a surface of the recess and the flange 84 on the housing. The actuator module is thus secured within the cavity in the casing 100 to provide the necessary loading force on the sealing layer and/or contact between the button and the actuator. Thus, the actuator assembly may be considered to be configured to provide the loading force by including the resilient elements 92 and the flanges 84.

Figure 8C:
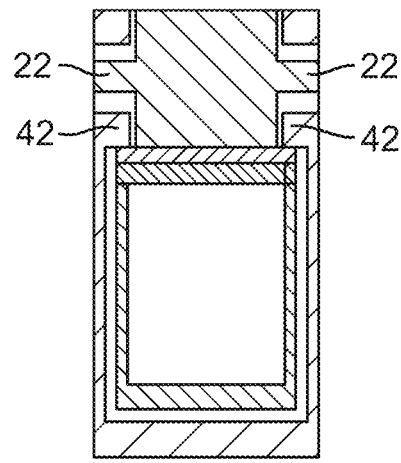

FIG. 8c shows a variation of the arrangement of FIGS. 8a and 8b. As in FIGS. 3c, 4c, 5c and 6c, the button 12 comprises a pair of flanges 22 which abut a corresponding end stop 42 which is formed on the casing.

Figure 9A:
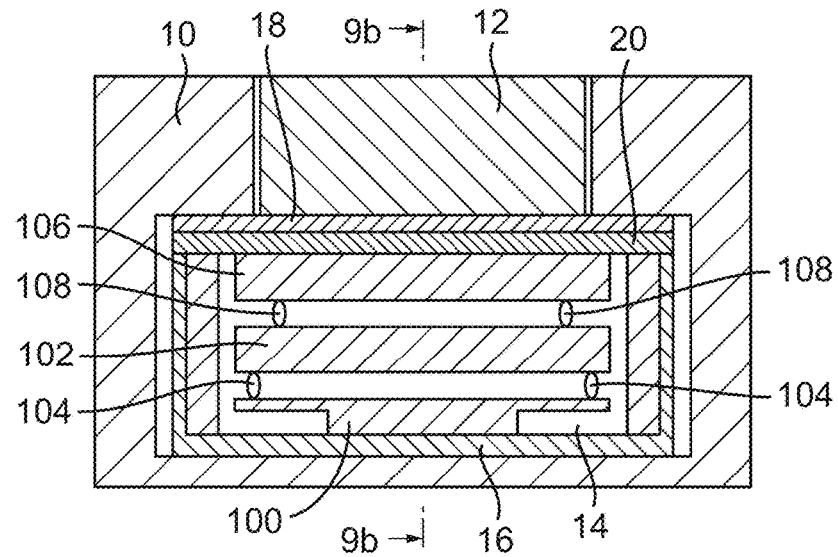
Figure 9B:
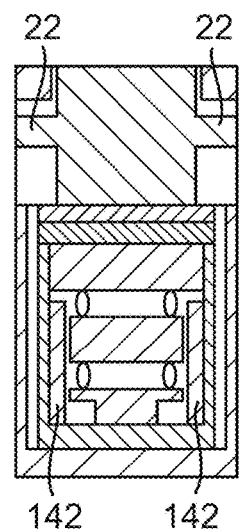

FIGS. 9a and 9b show a variant of the arrangement shown in FIG. 1a. Components which are the same retain the same reference number. As in FIG. 1a, FIGS. 9a and 9b show a haptic button assembly mounted within a cavity within a casing 10. The haptic button assembly comprises a button 12 which is activated by an actuator 14. In this Figure, one arrangement for the components of the actuator 14 are schematically shown and include a contact switch 100 and first and second sliders 102, 106 which are arranged in layers. A first set of ball bearings 104 separate the first slider 102 from the contact switch 100 and a second set of ball bearings 108 separate the first slider 106 from the second slider 106. When a user depresses the button 12, the vertical motion is transferred via the first and second sliders 102, 106 and the first and second sets of ball bearings through to the contact switch 100 to activate the actuator 14. Activation causes an SMA wire to contract which moves the first slider 102 horizontally and movement of the first slider 102 triggers vertical movement of the second slider 106. This vertical motion is then transferred to the button to create vertical movement of the button to give haptic feedback to a user.

Within the housing 16, there are a pair of endstop members which form an internal pair of end stops 142. As described above, when a user pushes too hard on the button, the second slider 106 abuts against the end stops 142 to prevent further movement of the button 12.

Figure 10A:
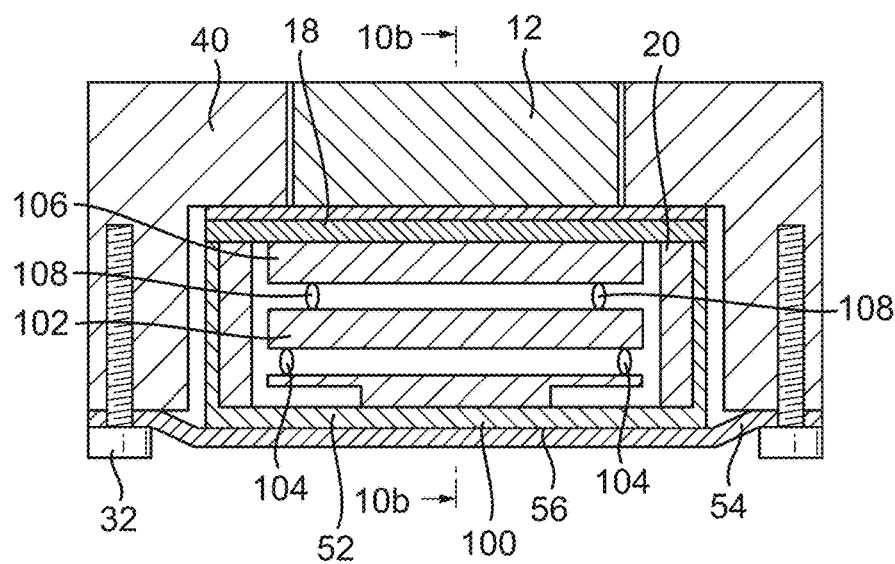
Figure 10B:
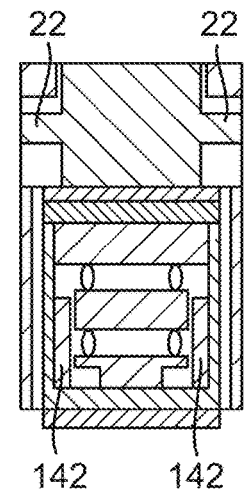

FIGS. 10a and 10b show a variant of the arrangement shown in FIG. 4a. Components which are the same retain the same reference number. As in FIG. 4a, FIGS. 10a and 10b show a haptic button assembly comprising a button 12 and an actuator 14 mounted within a cavity within a casing 40. The actuator 14 is housed within a housing 56 together with a restoring element 18 and the housing 56 is sealed by a sealing layer 20. The internal detail of the actuator 14 is as shown in FIG. 9a and comprises a contact switch 100 and first and second sliders 102, 106 each of which are separated by ball bearings 104, 108.

In this arrangement, the housing 56 has a similar shape to that shown in the arrangement of FIGS. 1a and 9a. A flexible base layer 52 is mounted to the housing 46. The base layer 52 comprises a pair of flexible flanges 54 which are arranged adjacent the ends of the casing 40. The button assembly is held in place within the casing 40 by a pair of screws 32 which are engaged in corresponding screw threads in the flanges 54 of the base layer 52 and the casing 40. Within the housing 16, there are a pair of endstop members which form an internal pair of end stops 142 to prevent the button 12 moving too far.

It will be appreciated that each of the arrangements shown in the other Figures may also be amended to include the internal endstop and FIGS. 9a and 10a are just provided to illustrate the use of this feature.

Figure 11A:
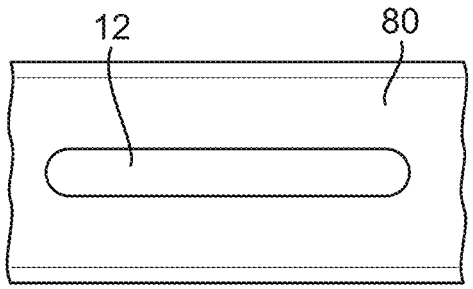
FIG. 11a is a perspective view of a button in a casing.
Figure 11D:
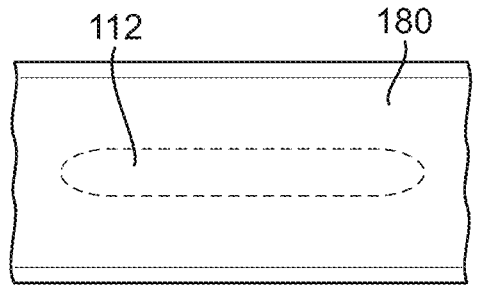
FIG. 11d is a perspective view of a casing similar to that of FIG. 11a with a gapless button design.
Figure 11B:
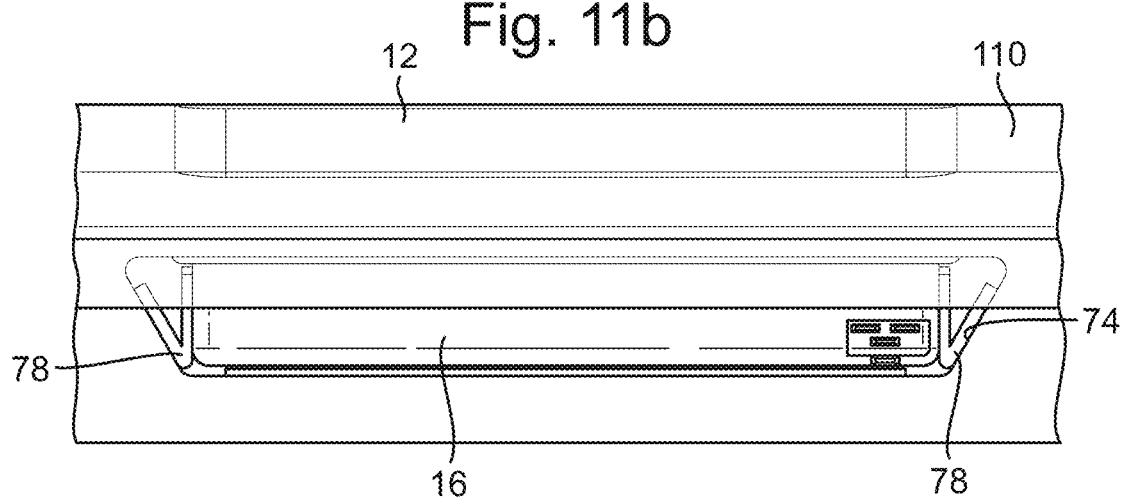
FIGS. 11b and 11c are cutaway side and isometric views of the button assembly of FIG. 6d within a casing.
Figure 11C:
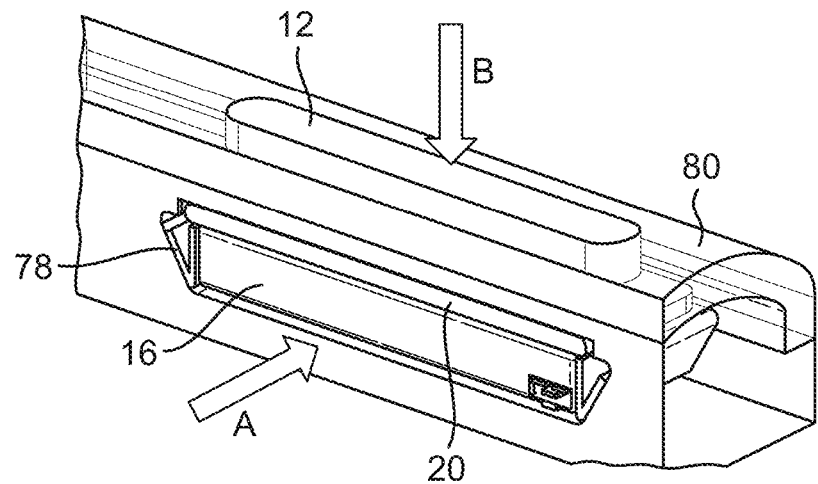

FIGS. 11a to 11c show alternative views of the arrangement shown in FIG. 6d. As in FIG. 6d, the button assembly comprises a button 12 and an actuator module mounted within a cavity within a casing 80. The actuator assembly comprises an actuator housed within a housing 16 and a sealing layer 20 which is adjacent the button 12. A pair of V-shaped resilient members 78 extend from the sides of the housing 16 and are received in corresponding recesses of the casing 80. In a first expanded position, part of each resilient member 78 abutting a corresponding surface 74 of the recess. FIG. 11c shows that the actuator assembly is inserted into the cavity in the direction of Arrow A and the button is inserted in the direction of arrow B.

FIG. 11d is a variation of the arrangement in FIG. 11a showing a gapless button design. In this arrangement, the button 112 is integral with the casing 180 and is illustrated schematically by the dotted lines. There is thus not a separate button which is inserted into the casing but a button is preformed on the casing. It will be appreciated that each of the arrangements above could be adapted to include such a gapless design.

Figure 12A:
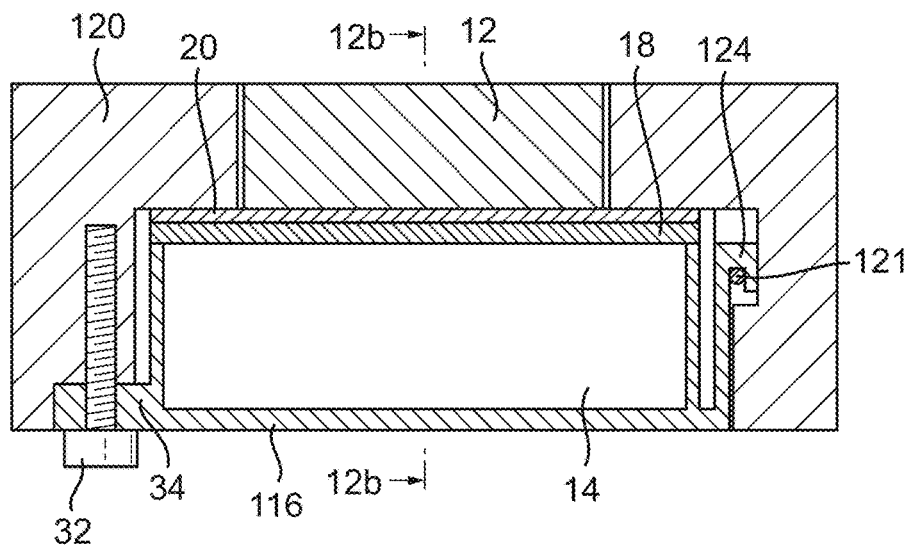
Figure 12B:
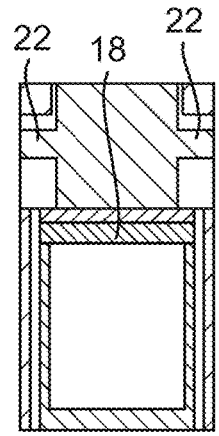

FIGS. 12a and 12b show a variant of the arrangement shown in FIG. 3a. Components which are the same retain the same reference number. As in FIG. 4a, FIGS. 12a and 12b show a haptic button assembly comprising a button 12 and an actuator 14 of an actuator module mounted within a cavity within a casing 120. A restoring element 18 and an (optional) sealing layer 20 are also depicted but could be omitted as described above. The button also comprises a pair of flanges 22 as described above.

The actuator is housed in a housing 116 which comprises a flange 34 which extends from one side of the housing near to the base of the housing 116. The actuator module is held in place within the casing 120 on this side by a screw 32 which is engaged in a corresponding hole in the flanges 34 of the housing 46 and an aligned screw thread in the casing 120. On the other side of the housing 116, the housing comprises a generally s-shaped flange 124 which extends from the base of the housing 116. An upper part of the flange 124 loops around a pin 121 and is received in a recess in the cavity. The S-shaped flange and pin provide a clip-in mechanism with the flange being hinged about the pin. As in the other screw arrangements, the contact and/or force can be adjusted by tightening or loosening the screw.

Figure 13A:
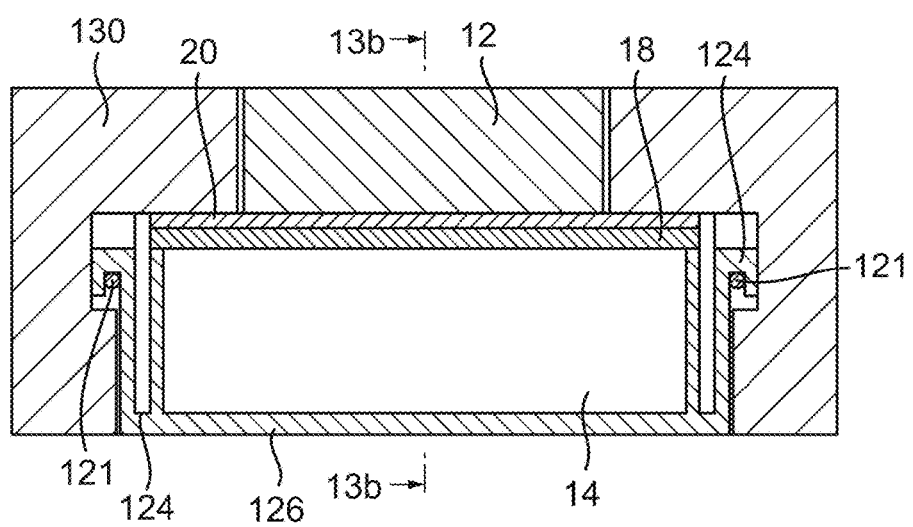
Figure 13B:
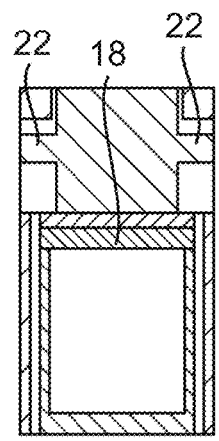

FIGS. 13a and 13b show a variant of the arrangement shown in FIG. 12a. Components which are the same retain the same reference number. As in FIG. 12a, FIGS. 13a and 13b show a haptic button assembly comprising a button 12 and an actuator 14 of an actuator module mounted within a cavity within a casing 130. A restoring element 18 and an (optional) sealing layer 20 are also depicted but could be omitted as described above. The button also comprises a pair of flanges 22 as described above.

In this arrangement, there are two S-shaped flanges 124; one on either side of the housing 126 for the actuator. An upper part of each flange 124 loops around a corresponding pin 121 and is received in a recess in the cavity. A final stage in the insertion of the actuator module may include inserting one of the pins 121. The housing 126 could be strengthened when using the clip in mechanism by using an additional base layer under the housing, e.g. as shown in FIG. 4a.

The term "bearing" is used interchangeably herein with the terms "plain bearing", "ball bearing", "flexure", "roller bearing". The term "bearing" is used herein to generally mean any element or combination of elements that functions to constrain motion to only the desired motion and reduce friction between moving parts. In some embodiments of the present techniques, more than one type of bearing element may be used in combination to provide the bearing functionality. Accordingly, the term "bearing" used herein includes any combination of, for example, plain bearings, ball bearings, roller bearings and flexures. In embodiments, a suspension system may be used to suspend the intermediate moveable element and/or the button within the haptic button assembly and to constrain motion to only the desired motion. For example, a suspension system of the type described in WO2011/104518 may be used. Thus, it will be understood that the term "bearing" used herein also means "suspension system". In embodiments, the bearing may be provided on, or may comprise, non-linear bearing surfaces. The bearing may be formed from any suitable material, e.g. ceramic.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A standalone shape memory alloy (SMA) actuator module for incorporation in a casing of an electronic device and for providing haptic feedback via a button of the electronic device, the actuator module comprising:
   a housing;
   an actuator housed within the housing, wherein the actuator comprises:
       a static part;
       a moveable part that is moveable with respect to the static part;
       at least one SMA wire configured, on contraction, to move the moveable part relative to the static part; and
       a restoring element configured to restore the moveable part to its original position; and
   at least one resilient element configured to bring the actuator module into contact with the button and the casing of the electronic device when the actuator module is mounted within the electronic device,
   wherein the at least one resilient element is configured to deform, thereby transferring force to the casing of the electronic device, in response to a force applied to the button that exceeds a predetermined maximum force.

2. The actuator module of claim 1, wherein the at least one resilient element comprises a pair of resilient elements which are moveable between a first extended configuration and a second compressed configuration and which are biased in the first extended configuration or the second compressed configuration whereby when the actuator module is mounted within a cavity in the casing of the electronic device, the resilient elements bring the actuator module into contact with the button and the casing of the electronic device.

3. The actuator module of claim 1, wherein the at least one resilient element is integral with the housing.

4. The actuator module of claim 1, further comprising a sealing layer, wherein the housing further comprises a pair of flanges against which the at least one resilient element abuts to apply a loading force to the sealing layer.

5. The actuator module of claim 1, wherein the at least one resilient element comprises an angled component which in use engages a corresponding angled surface of a cavity in the casing of the electronic device.

6. The actuator module of claim 1, wherein the at least one resilient element is a metal spring.

7. The actuator module of claim 1, wherein the actuator module is press fit in a cavity in the casing of the electronic device to bring the actuator module into contact with the button and the casing of the electronic device.

8. The actuator module of claim 1, wherein the housing comprises a pair of flanges each having a screw hole for receiving a screw which is secured to the casing of the electronic device to bring the actuator module into contact with the button and the casing of the electronic device.

9. The actuator module of claim 1, further comprising a sealing layer, wherein the at least one resilient element is configured to apply a loading force to the sealing layer when the actuator module is mounted within the electronic device.

10. The actuator module of claim 1, wherein the at least one SMA wire contracts to provide vertical movement of the button.

11. A haptic button assembly comprising:
a button; and
the actuator module of claim 1, wherein when a user presses the button, the actuator module is configured to activate to provide haptic feedback to the user.

12. The haptic button assembly of claim 11, further comprising at least one end stop within the housing, wherein the end stop is configured to engage with a component within the actuator to limit movement of the actuator component when a user presses on the button.

13. The haptic button assembly of claim 11, further comprising at least one end stop outside the housing, wherein the end stop is configured to limit movement of the actuator module and/or deflection of the housing.

14. The haptic button assembly of claim 11, wherein the button comprises a pair of flanges which are configured to engage with corresponding end stops on a cavity in the casing of the electronic device to limit movement of the actuator module.

15. A method of manufacturing an electronic device with a haptic button assembly, the method comprising:
providing a standalone shape memory alloy (SMA) actuator module comprising an actuator within a housing and at least one resilient element, wherein:
the actuator comprises:
a static part;
a moveable part that is moveable with respect to the static part;
at least one SMA wire configured, on contraction, to move the moveable part relative to the static part; and
a restoring element configured to restore the moveable part to its original position; and
in use, the actuator when activated provides haptic feedback to a user pressing on a button of the haptic button assembly; and
mounting the actuator module within a cavity within a casing in the electronic device so that the at least one resilient element brings the actuator module into contact with the button and the casing of the electronic device,
wherein the at least one resilient element is configured to deform, thereby transferring force to the casing of the electronic device, in response to a force applied to the button that exceeds a predetermined maximum force.

16. The method of claim 15, further comprising attaching a button after mounting the actuator module.

17. The method of claim 15, wherein mounting the actuator module comprises press fitting the actuator module within the cavity.

18. The method of claim 15, wherein mounting the actuator module comprises fixing the housing to the cavity using a screw thread arrangement.

19. The method of claim 15, wherein the at least one resilient element comprises a pair of resilient elements and mounting the actuator module comprises compressing the pair of resilient elements to a compressed configuration as the actuator module is mounted in the cavity whereby the resilient elements attempt to revert to the expanded configuration once the actuator module is inserted in the cavity.

* * * * *